Nov. 12, 1940.   W. E. BERKEY ET AL   2,221,569
DIRECT CURRENT WELDING WITH TUBE CONTROL
Filed July 20, 1938
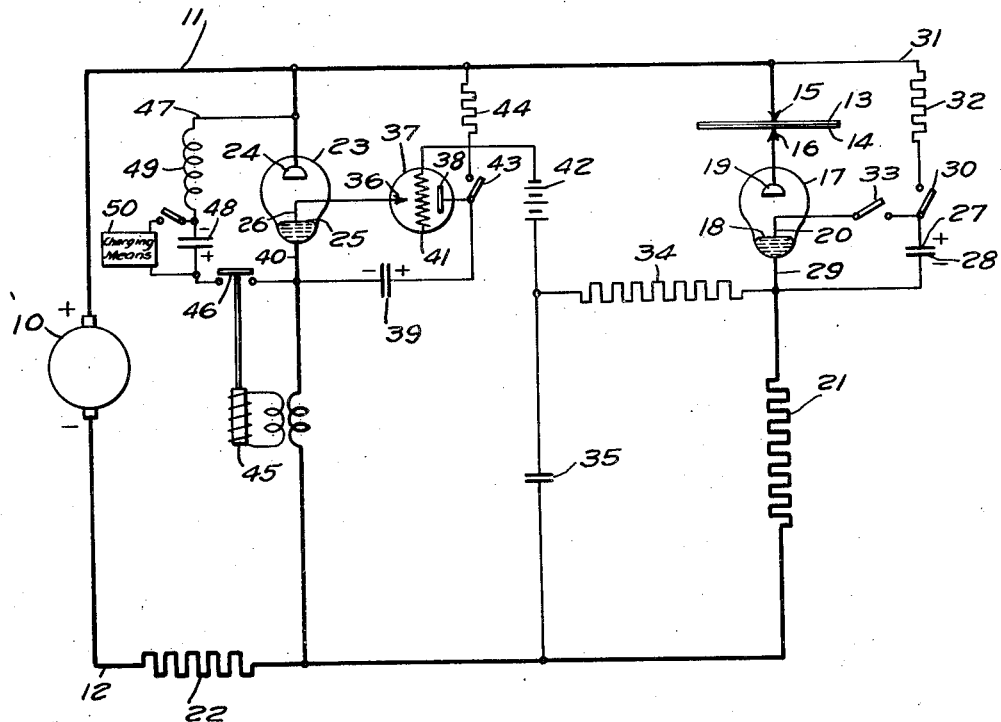
WITNESSES:
E. A. McCloskey
R. W. Bailey
INVENTORS
William E. Berkey
and John W. McNoll.
BY
F. W. Lyle
ATTORNEY Patented Nov. 12, 1940

2,221,569

UNITED STATES PATENT OFFICE 2,221,569

DIRECT CURRENT WELDING WITH TUBE CONTROL

William E. Berkey, Forest Hills, Pa., and John W. McNall, East Orange, N. J., assignors to Westinghouse Electric & Manufacturing Company, East Pittsburgh, Pa., a corporation of Pennsylvania Application July 20, 1938, Serial No. 220,216

5 Claims. (Cl. 250—27)

Our invention relates to a circuit for supplying power, and especially to a circuit for supplying direct current as a welding current.

An object of our invention is to provide a circuit giving a direct current of rectangular shape from a direct current power source, especially for an accurately controlled period.

Another object of our invention is to provide welding current having a rectangular shape from a direct current source for a predetermined period of time under the control of discharge devices.

Other objects and advantages of our invention will be apparent from the following description and drawing, in which the figure is a diagrammatic illustration of a circuit embodying our invention.

In some applications, it may be more convenient or even necessary to make small welds using a 220 or 440 volt direct current power source. In applying such a circuit for welding or for other power uses, we prefer to utilize a circuit to give a rectangular shaped output wave and to accurately control the time length of the rectangular output wave. In the figure, 10 represents a source of direct current which may be a generator providing energy to the positive line 11 and the negative line 12.

The load in the preferred utilization of our invention is a welding load composed of the pieces 13 and 14 which it is desired shall be welded together. The electrodes 15 and 16 are illustrated bearing upon the welding load. The electrode 15 is connected to the positive side 11, and the welding electrode 16 has in series therewith an electric discharge device 17. This discharge device has preferably a mercury pool 18 as a cathode therein, and has the anode 19 connected to the electrode 16. An auxiliary control electrode 20 of this electric discharge device 17 is preferably of the make-alive type of a high resistance material, such as boron carbide, partly immersed in the mercury pool. The cathode 18 is connected through a resistance 21 and resistance 22 to the negative side of the direct current source 10. Across the two lines 11 and 12 and in series with resistance 22 is also preferably connected a discharge device 23 similar in construction to the device 17, and having an anode 24, a mercury cathode 25, and the control electrode 26 therein. This discharge device 23 is connected in parallel with the load 13, 14, the discharge device 17, and resistance 21.

The auxiliary control electrode 20 in the discharge device 17 has connected thereto a condenser 27, whose negative plate 28 is connected to the lead 29 extending from the mercury cathode 18. This condenser may be charged by a switch 30, extension 31 and resistance 32 extending to the positive line 11. When it is desired to pass welding current through the load, the switch 33 is closed, and the condenser 27 will discharge through the auxiliary electrode 20 and permit the discharge device 17 to ignite. In parallel with the resistance 21 is a resistance 34 and condenser 35. This condenser 35 will be charged up when the discharge current of the discharge device 17 passes to the negative line 12 by the voltage drop across resistance 21.

To the control electrode 26 of the discharge device 23 is connected the cathode 36 of the control tube 37. The anode 38 is connected through a condenser 39 to the cathode lead 40 of the discharge device 23. The control electrode 41 of the control tube 37 is connected to the condenser 35 through a battery 42. The battery 42 will normally apply a charge to the control electrode 41, preventing the discharge therethrough. The condenser 39 may be charged so that its positive plate is connected to the electrode 38. Such a charging means is illustrated by the switch 43 and resistance 44 connected to the positive line 11, as shown. In the cathode connection 40 between the tube 23 and the negative line 12 is a relay 45 operating a switch 46, making a connection in a circuit 47 parallel with the tube 23, and including a condenser 48 and an inductance 49. The condenser may be charged by any suitable means, such as 50.

The charge on condenser 35, caused by the discharge current through the discharge device 17, is utilized to unblock the grid-controlled tube 37. The time taken to charge up the condenser 35 and to start the discharge through 37 varies with the capacity of 35 and the resistance 34 and the voltage drop across resistance 21. These values may be varied to give very accurate control from 10 microseconds to several seconds. When the grid-controlled tube 37 conducts, the previously charged condenser 39 discharges through the discharge device 23 and shorts the current from the tube 17 and the weld, because of the lower drop through this tube 23 between the positive and negative lines. The current through the tube 23 causes the relay 45 to close the switch 46 and the condenser 48 discharges through the inductance 49 and the tube 23, causing the current through discharge device 23 to go to zero on the oscillating transit determined by the values of the capacitance 48 and the inductance 49. This discharge through the tube extinguishes the power current through discharge device 23 and releases the relay 45 for another operation.

The utilization of this circuit accordingly utilizes a very accurate predetermined rectangular current wave caused by the discharge of the current through the weld and discharge device 17, and its accurate termination for a predetermined interval by the action of the capacitance means and discharged through the other discharge device 23. The currents controlled may be those of less than one ampere to currents of several hundred amperes. By utilizing tubes having a constant arc drop for the time of the weld, the energy put into the weld is also constant by this circuit. The circuit, however, has the special advantages of very accurately applying a welding current for a very short time of a few microseconds, and hence can be utilized to weld very thin and delicate sheets of material that might be damaged with the passing of a longer welding current.

While we have disclosed a preferred embodiment of our invention, yet it is apparent that many modifications may be made in the various elements and their interconnections. Accordingly, we desire only such limitations to be imposed upon the following claims as are necessitated by the prior art.

We claim as our invention:

1. A circuit comprising a load and two discharge devices, the first of said discharge devices being in series with the load and an impedance and the second discharge device being connected in parallel with the first discharge device, said impedance and said load through a path of resistance which is low compared with that of the path through said load, said impedance, and said first discharge device, means actuated by a discharge in said first discharge device to start the discharge in said second discharge device thereby setting up a short circuit path around said load and first discharge device, and means extinguishing the discharge in said second discharge device.

2. A circuit comprising a continuous-current source supplying a load and two discharge devices, the first of said discharge devices being in series with an impedance and said load, the second being normally extinguished and connected in parallel with said load, said impedance and said first discharge device through a path of resistance which is low compared with that of the path through said load, said impedance, and said first discharge device, capacitance means charged by the current from said first discharge device for initiating current flow through said second discharge device to extinguish said first discharge device.

3. A circuit comprising a continuous-current source supplying a load and two discharge devices, the first of said discharge devices being in series with an impedance and said load, the second being normally extinguished and connected in parallel with said load, said impedance and said first discharge device through a path of resistance which is low compared with that of the path through said load, said impedance, and said first discharge device, capacitance means charged by the current from said first discharge device for initiating current flow through said second discharge device to extinguish said first discharge device, and means extinguishing the discharge in said second discharge device after a predetermined interval.

4. A circuit comprising a continuous-current source supplying a load and two discharge devices, the first of said discharge devices being in series with an impedance and said load, the second being normally extinguished and connected in parallel with said load and said first discharge device through a path of resistance which is low compared with that of the path through said load, said impedance, and said first discharge device, a control electrode in said second discharge device, a capacitance energized by the current from said first discharge device applying a charge to said control electrode initiating a discharge through said second discharge device, and capacitance means shunting said second discharge device for extinguishing the discharge therein after a predetermined time.

5. A circuit comprising a load and two discharge devices of the igniter-electrode type, the first of said discharge devices being in series with an impedance and the load, the second being normally extinguished and connected in parallel with said load and said first discharge device through a path of resistance which is low compared with that of the path through said load, said impedance, and said first discharge device, a control tube connected to the igniter electrode of said second discharge device, capacitance means energized by the current from said first discharge device discharging through said control tube and initiating a discharge in said second discharge tube, and a capacitance means connected for extinguishing the discharge in said second discharge device.

WILLIAM E. BERKEY.
JOHN W. McNALL.